United States Patent [19]

Inoue et al.

[11] 4,065,792
[45] Dec. 27, 1977

[54] FACSIMILE SYSTEM

[75] Inventors: Toshitugu Inoue, Kyoto; Takuji Nakamura, Hirakata; Tadayuki Onoda; Tatuo Nakatugawa, both of Kadoma, all of Japan

[73] Assignee: Matsushita Electric Industrial Co., Ltd., Kadoma, Osaka, Japan

[21] Appl. No.: 707,343

[30] Foreign Application Priority Data

July 24, 1975 Japan .................................. 50-90887
July 24, 1975 Japan .................................. 50-90889
July 24, 1975 Japan .................................. 50-103190

[22] Filed: July 21, 1976

[51] Int. Cl.² .......................................... H04N 1/08
[52] U.S. Cl. ................................. 358/286; 358/290; 101/415.1; 358/256
[58] Field of Search ............... 358/256, 257, 258, 285, 358/305, 286, 290; 101/415.1; 271/3

[56] References Cited

U.S. PATENT DOCUMENTS

| | | | |
|---|---|---|---|
| 2,716,153 | 8/1955 | Magmusson | 101/415.1 |
| 2,740,686 | 4/1956 | Kirchel | 101/415.1 |
| 3,737,575 | 6/1973 | Kominami | 358/286 |
| 3,816,659 | 6/1974 | Landsman | 358/264 |

*Primary Examiner*—Robert L. Griffin
*Assistant Examiner*—Edward L. Coles
*Attorney, Agent, or Firm*—Stevens, Davis, Miller & Mosher

[57] ABSTRACT

Disclosed is an improvement over a facsimile transmitter apparatus of the type in which a scanning system disposed within a transparent cylinder scans a subject copy wrapped around the cylinder, wherein one side edge of a subject copy wrapping belt is securely fixed to the outer surface of the cylinder in the axial direction thereof while the other side edge is securely fixed to a take-up roller after the belt having been wrapped therearound, the take-up roller being biased to resist the unrolling of the wrapping belt, and the transparent cylinder is rotated through in excess of 360° from the initial position to the wrapping position where the subject copy is wrapped completely around the transparent cylinder and between the transparent cylinder and the wrapping belt, the cylinder being reversed in rotation to release and discharge the subject copy.

12 Claims, 17 Drawing Figures

FACSIMILE SYSTEM

The present invention relates to generally a facsimile system and more particularly a facsimile system of the type in which a scanner unit is disposed within a transparent cylinder for scanning a subject copy wrapped around of the rotating cylinder.

In FIGS. 1 and 2 there is shown an example of the conventional facsimile systems of the type described. A subject copy 1 is wrapped around a cylinder 3 and scanned by a scanner unit 6 which has its shaft 8 operatively coupled to a motor 7 so that upon energization of the motor 7 the scanner unit 6 is rotated coaxially of or in the circumferential direction of the cylinder 3 for effecting the main scanning. The scanner unit 6 includes a lamp 5 and a phototransistor 4 for reading out the copy 1. An endless wire or belt 9 is provided to displace the scanner unit 6 in the axial direction of the cylinder 3 for effecting the auxiliary scanning, and is driven by a pulley 10 which in turn is driven by a motor (not shown).

The subject copy feeding system will be described with particular reference to FIG. 2. Four rollers 16, 18, 19 and 20 are disposed around the cylinder 3, and an endless belt 11 is wrapped around these four rollers 16 − 20 and the cylinder 3 as shown in FIG. 2. When the roller 16, which is operatively coupled to a motor 12 through gears 15 and 17 (See FIG. 1), is rotated in the direction $d$ in FIG. 2, the endless belt 11 is driven in the direction indicated by the arrow $b$. When the subject copy is put between the cylinder 3 and the belt through over a guide 2 in the direction indicated by the arrow $a$, the subject copy 3 is led by the feed roller 18 and the cylinder 3 and is wrapped around the cylinder 3. When the leading edge of the subject copy 3 reaches the proximity of the roller 16, a switch 14 is actuated by a cam 13 (See FIG. 1), so that the motor 12 is de-energized. Thus the step for wrapping the subject copy around the cylinder is accomplished.

The facsimile system of the type described above has the following defects described below. Firstly, since it is difficult to locate the rollers 16 and 18 in a closely spaced apart relation and since the endless belt 11 does not act as a guide, the subject copy cannot be wrapped around the cylinder 3 at the position between them. Further, the effective wrapping length of the subject copy; that is, the length of the circumferential distance of the cylinder 3 over which the subject copy 1 is wrapped, becomes shorter. Secondly, it is difficult to smoothly feed the subject copy because it must be inserted in the direction $a$ in synchronism with the running endless belt 11.

In view of the above, the primary object of the present invention is to provide a facsimile system which may substantially overcome the above and other problems encountered in the prior art systems.

Figure 10A:
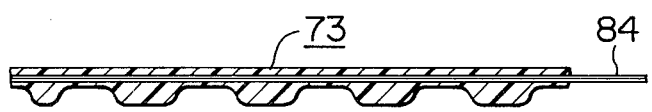
Figure 11:
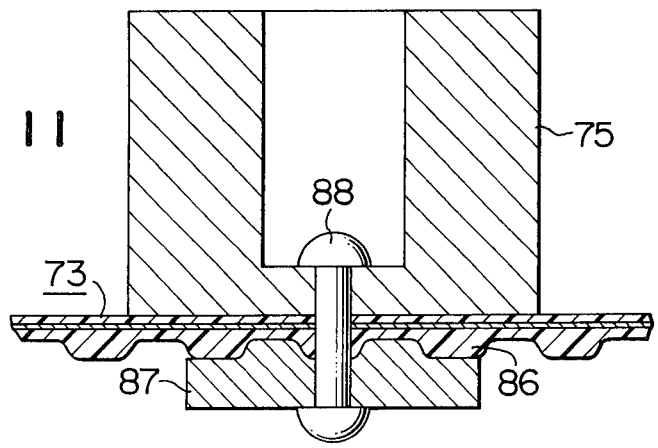
Figure 12:
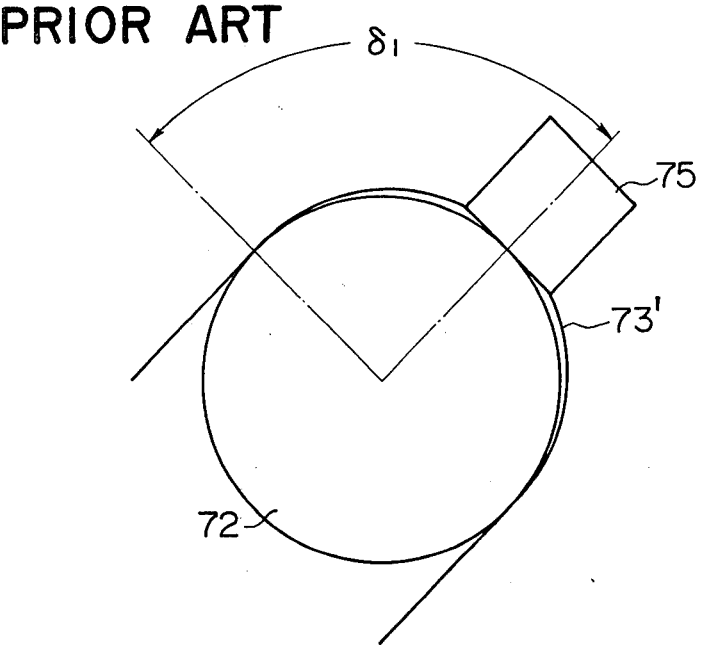
Figure 13:
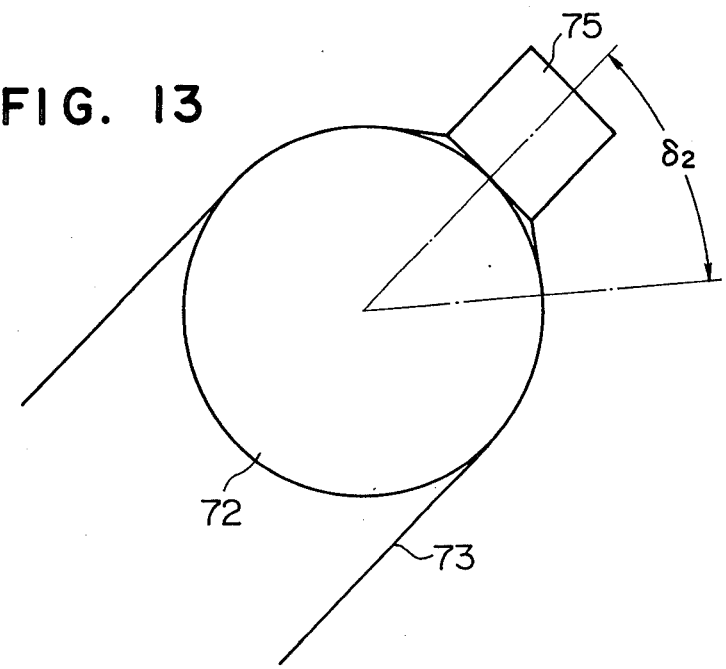
Figure 14:
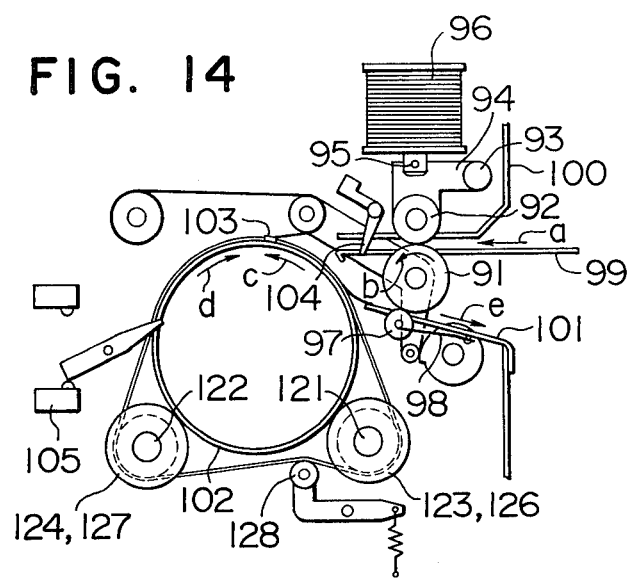
Figure 15:
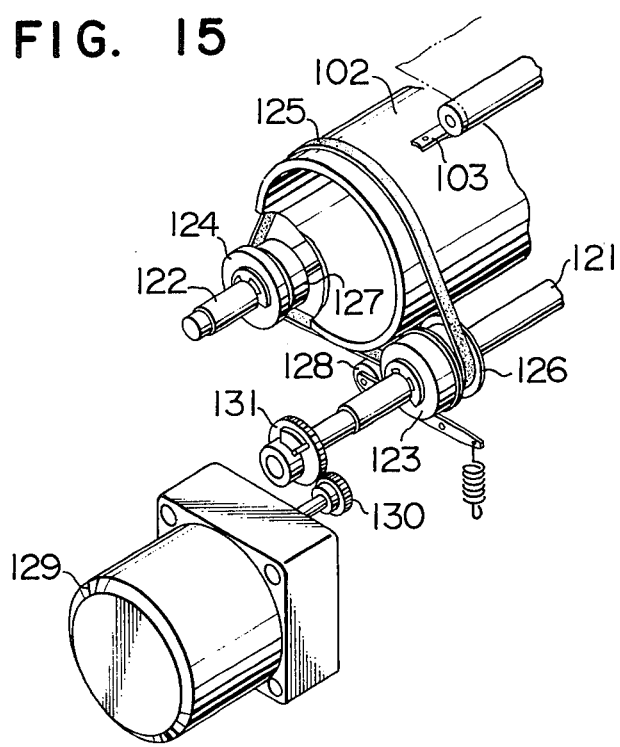

FIGS. 10(a) and (b) are fragmentary vertical and horizontal sectional views, respectively, of a timing belt in accord with the present invention;

FIG. 11 is a view, on enlarged scale, used for the explanation of the mounting of a recording stylus on the timing belt;

FIGS. 12 and 13 are views used for the exlanation of the relative positions of the pulley, the timing belt and the recording stylus holder of the conventional system and the system in accord with the present invention, respectively;

FIG. 14 is a schematic side view of a second embodiment of a facsimile transmitter apparatus in accord with the present invention; and FIG. 15 is a fragmentary perspective view, on enlarged scale, thereof illustrating a driving system thereof.

FIRST EMBODIMENT, FIGS. 3 THROUGH 13

Figure 1:
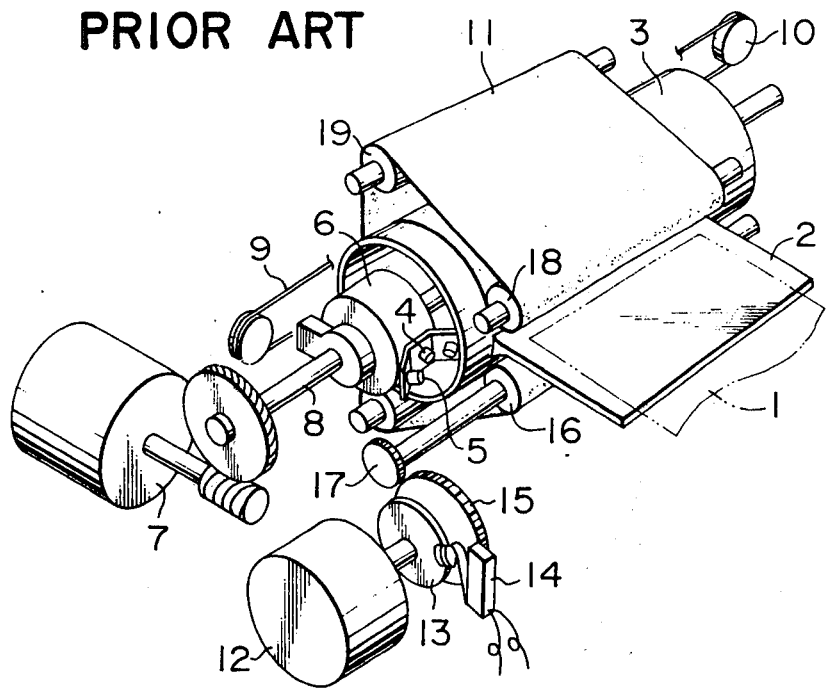
FIGS. 1 and 2 are views used for the explanation of the problems encountered in the conventional facsimile systems.
Figure 2:
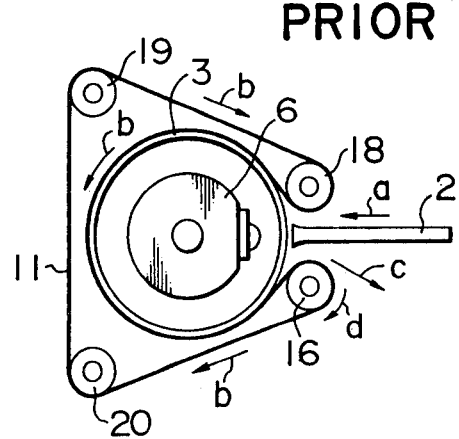
Figure 3:
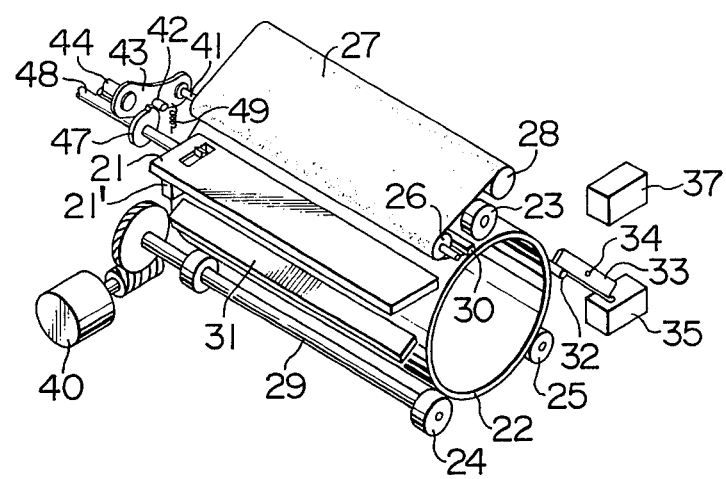
FIG. 3 is a fragmentary perspective view of a first embodiment of a facsimile transmitter apparatus in accordance with the present invention.

Referring to FIG. 3, a scanning cylinder 22 is rotatably supported by three rollers 23, 24 and 25, and the driving roller 24 is carried by a shaft 29 which in turn is drivingly coupled through a worm gear train to a motor 40 and is made into frictional contact with the scanning cylinder 22 so that upon energization of the motor 40 the scanning cylinder 22 is rotated. The remaining rollers 23 and 25 are driven rollers which are rotated with the scanning cylinder 22. One side edge of a belt 27 is securely fixed to the scanning cylinder 22 in the axial direction thereof by means of a retaining member 30, and the belt 27 passes over a pressure roller 26 and is wrapped around a take-up roller 29 which is normally biased to rotate in the direction $e$ (See FIG. 4) so as to impart the tension to the belt 27.

Figure 4:
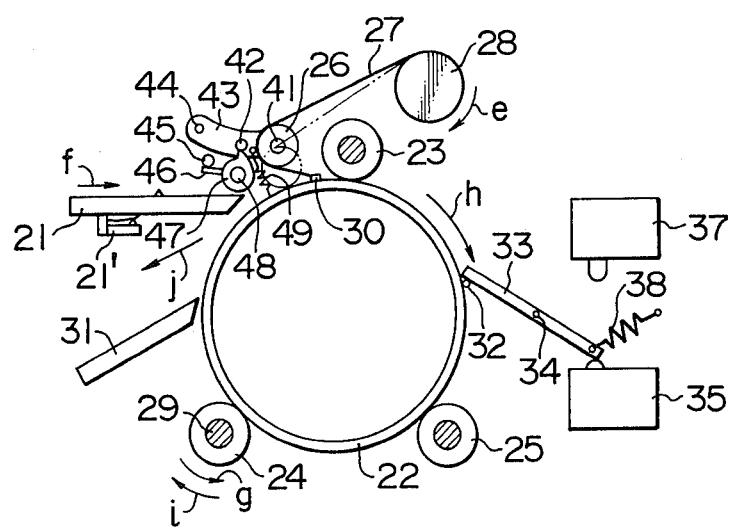
FIGS. 4 and 5 are schematic side views corresponding to FIG. 3 for explaining the mode of wrapping a subject copy around a transparent scanning cylinder or drum.
Figure 5:
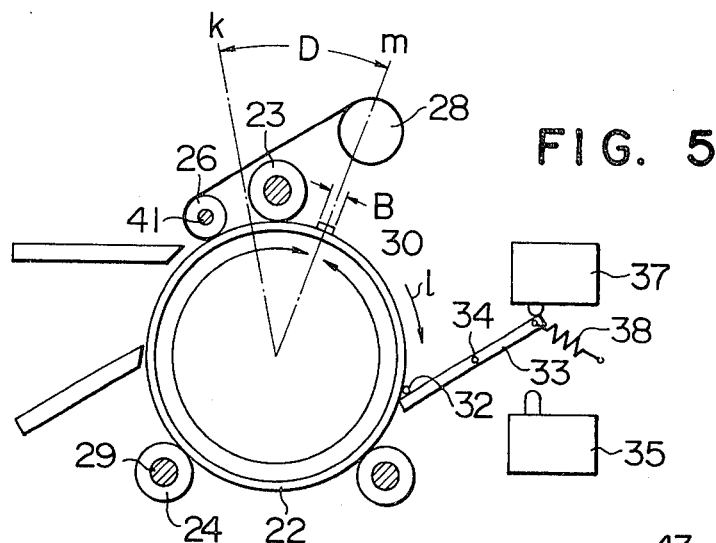

Referring to FIG. 4, when the subject copy is fed in the direction indicated by the arrow $f$, a microswitch 21' is actuated, and when the leading edge of the subject copy is bring into contact with the retaining member 30, the signal generated by the microswitch 21' is transmitted through a timer. Therefore the pressure roller 26 is displaced to the lower or operative position indicated by the broken lines by such a pressure roller driving device as described hereafter, and then the roller 24 is rotated in the direction indicated by the arrow $g$, so that the scanning cylinder 22 is rotated in the direction indicated by the arrow $h$. The leading edge of the subject copy is clamped between the scanning cylinder 22 and the belt 27 and is wrapped around the scanning cylinder 22. When releasing the subject copy, the driving roller 24 is rotated in the direction $i$, so that the trailing edge of the subject copy is passed through the gap between the guide 21 and the scanning cylinder 22 and goes along a guide 31 in the direction indicated by the arrow $j$. FIG. 5 shows the subject copy wrapped and clamped around the scanning cylinder 22, and the roller driving mechanism is not shown. The scanning cylinder 22 has been rotated through 360° + D°; that is, the retaining member 30 is displaced from the initial angular position k through 360° + D° in the direction l to the operative or retaining position m. Thus the subject copy is completely wrapped around the scanning cylinder 22.

Next referring particularly to FIGS. 4 and 5, the mode of operation of a switch for detecting the stop position of the scanning cylinder 22 will be described. FIG. 4 shows the position of the scanning cylinder 22 when the subject copy is released therefrom. When the scanning cylinder 22 is rotated in the counterclockwise direction, a pin 32 extended from the scanning cylinder 22 engages with an actuating lever 33 to rotate it about its pivot pin 34 in the clockwise direction, so that a first microswitch 35 is actuated. The actuating lever 33 is loaded with a return spring 38 so that when the pin 32 is disengaged with the actuating lever 33, the latter is held in the neutral position (the horizontal position in FIG. 4). When the subject copy is fed and the scanning cylinder 22 is rotated in the clockwise direction, the pin 32 is engaged with the actuating lever 33, as a result, the lever 33 is rotated in the counterclockwise direction about the pivot pin 34 as shown in FIG. 5, so that a second microswitch 37 is actuated. Consequently, the scanning cylinder 22 is stopped and the subject copy is wrapped around the scanning cylinder 22.

Next referring to FIGS. 3, 4 and 5, the pressure roller shifting mechanism for driving the pressure roller 26 will be described in detail. The pressure roller 26 is carried rotatably by a shaft 41 which in turn is rotatably supported by one end of a lever 43 having the other end pivoted to a stationary member (not shown) with a pivot pin 44. A pin 42 is extended from the lever 43 in order to engage it with a cam 47. The cam 47 engages with the pin 42 to cause the swinging movement of the lever 43 about its pivot pin 44, so that the pressure roller 26 is moved toward or away from the scanning cylinder 22. A spring 49 is loaded between the lever 43 and a stationary member (not shown) so as to normally bias the pressure roller 26 into engagement with the scanning roller 22. The cam 47 is carried by a shaft 48 for rotation, and a stopper pin 46 is extended from the cam 47 in order to engage it with a stopper 45 extended from a stationary member (not shown). The cam shaft 48 and the cam 47 are prevented from rotating through a predetermined angle by the engagement of the stopper pin 46 with the stopper 45. More particularly, the stopper 45 and the stopper pin 47 are so positioned that they engage with each other when the pin 42 of the lever 43 is displaced to the raised position by the cam 47.

Figure 6:
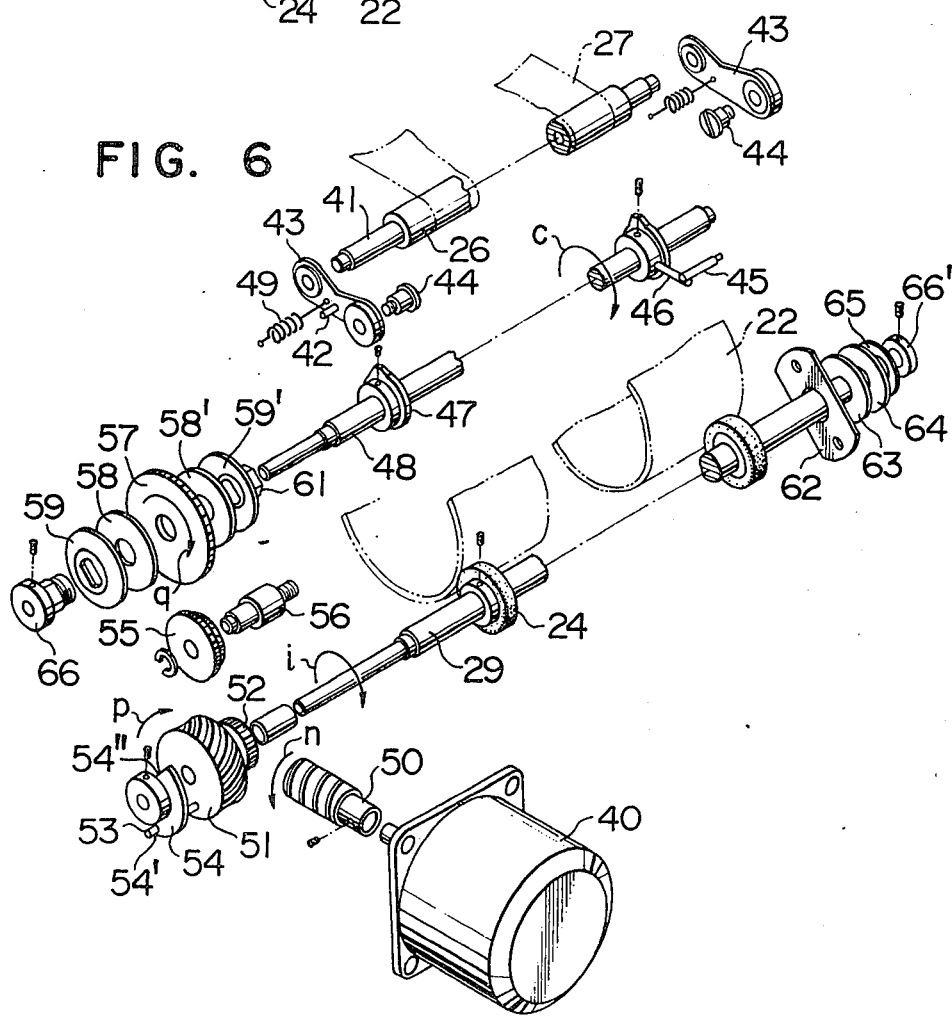
FIG. 6 is an exploded view of a driving system thereof.
Figure 7:
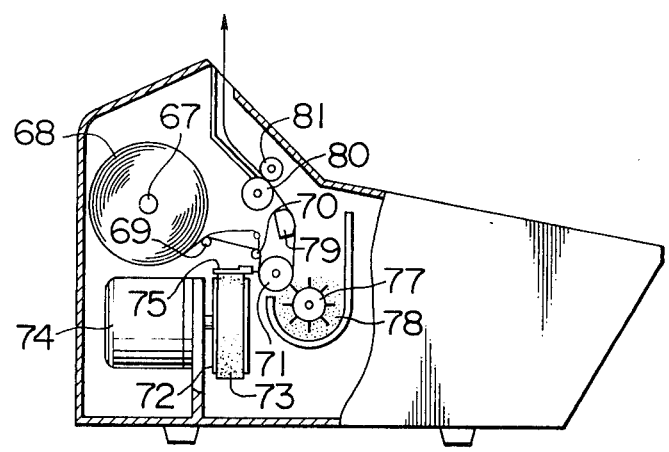
FIG. 7 is a schematic side view of a facsimile receiver apparatus incorporating the present invention.

Next referring particularly to FIG. 6, the mechanism for drivingly coupling both the cam shaft 48 and the shaft 29 of driving roller 24 to a common prime mover or motor 40 will be described in detail. Leaf springs 59, and 59', lining or friction disks 58 and 58' and a spur gear 57 are mounted at one end of the cam shaft 48 with a bolt 66 and a nut 61. The spur gear 57 is freely rotatable about the bolt 66, but the rotation of the leaf spring 59 is not permitted because it has a rectangular hole. When the load torque exceeds a predetermined value, the spur gear 57 slips relative to the lining disk 58. A spur gear 52 and a worm wheel 51 are rotatably carried at one end of the shaft 29 and are made integral. A cam 54 is also carried by the shaft 29 adjacent to the worm wheel 51, and a pin 53 is extended from the worm wheel 51 so as to engage it with the cam 54. Upon rotation of the worm wheel 51, the pin 53 engages with either of a stepped cam surface 54' or 54" of the cam 54 before the shaft 29 is rotated. In other words, the worm wheel 51 is coupled to the shaft 29 with a predetermined play angle. (That is, the rotation of the shaft 29 is started only after the worm wheel 51 was rotated through a predetermined angle.) A brake mechanism as shown in FIG. 6 is attached to the other end of the shaft 29. A brake base 62 is mounted on a stationary member (not shown), and a spacer 63, a lining disk 64 and a leaf spring 65 are carried by the shaft 29 and are pressed against the brake base 62 by a coollar 66' attached to the shaft 29. Therefore a predetermined braking or retarding force is applied to the shaft 29 relative to the stationary member. A worm 50 carried by the shaft of the motor 40 is in mesh with the worm wheel 51 while the gears 52 and 57 are meshed with each other through an idle gear 55.

Referring back to FIG. 4, the mode of operation of the pressure roller 26 for wrapping the subject copy around the scanning cylinder 22 will be described in detail. When the worm 50 is rotated in the direction n, the worm wheel 51 is rotateed in the direction p. The pin 53 is moved away from the stepped surface 54' of the cam 54 so that the cam 54 and hence the shaft 29 is not permitted to rotate. The rotation of the worm wheel 51 is transmitted through the gear 52 and the idle gear 55 to the spur gear 57 so as to rotate the latter in the direction q. As a result, the cam 47 is also rotated in the direction q and the pin 42 is released from the raised cam surface of the cam 47, so that the lever 43 is rotated clockwise direction under the force of the spring 49 to press the pressure roller 26 against the scanning cylinder 22. Further rotation of the worm wheel causes the pin 53 to engage with the stepped cam surface 54" of the cam 54 so as to rotate the shaft 29 in the direction i. Therefore the driving roller 24 drives the scanning cylinder 22 so that the subject copy is wrapped around the cylinder 22. When the stopper pin 46 of the cam 47 engages with the stopper 45, the rotation of the cam shaft 48 is stopped, but the cylinder 22 continues rotation until it reaches the predetermined position; that is, until the pin 32 engages with the actuating lever 33. In this case, the spur gear 57 is slipping relative to the lining disk 58.

When releasing the subject copy, the worm 50 is rotated in the opposite direction. Because of the action of the cam 54, the cam shaft 48 is rotated first and then the shaft 29 is rotated to rotate the scanning cylinder 22, whereby the subject copy is unwound therefrom. When the pin 53 of the worm wheel 51 is disengaged with the cam 54; that is, when the shaft 29 is free to rotate, the brake mechanism on the other side or end of the shaft 29 prevents the shaft 29 and hence the scanning cylinder 22 from rotating under the external force.

When the scanning cylinder 22 is made of a transparent synthetic resin, the surface of the scanning cylinder 22 tends to be damaged when assembling the mechanism or when the subject copy is inserted or released, so that the resultant surface flaws appear on the received facsimile pictures so as to make the picture unclear. To overcome this problem, according to the present invention, a coating consisting of a hard and transparent synthetic resin and multifunctional silanole is applied over the surface of the scanning cylinder.

Figure 8:
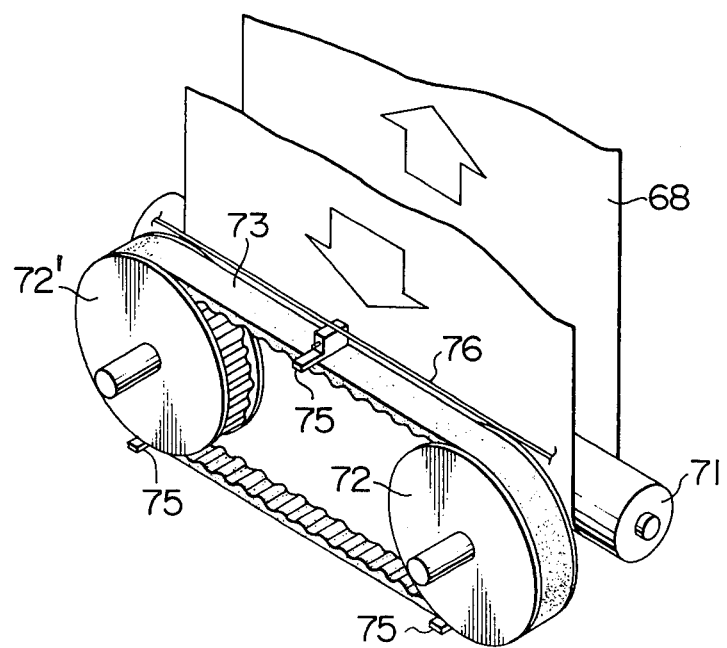
FIG. 8 is a perspective view of a belt stylus system thereof.

Next referring to FIGS. 7 to 13, the scanning system will be described in detail. A rolled record sheet 68 carried by a bobbin 67 is unrolled at a predetermined speed and passes over guide rollers 69 and 70 and a main roller 71. A timing belt 73 is wrapped around timing belt pulleys 72 and 72' carried by shafts substantially perpendicular to the axis of the main roller 71 and spaced apart from each other by a suitable distance in parallel with the main roller 71. The timing belt pulley 72 is driven by a motor 74 so that the timing belt 73 is driven in proportion to the feed speed of the record sheet 68. In this specification, the feed of the record sheet 68 is referred to as "the auxiliary scanning" while the drive of the timing belt 73, as "the main scanning." The length of the timing belt 73 is a few times as length as the main scanning, and a plurality of recording stylus holders 75 are carried by the timing belt 73 and are spaced apart from each other by a suitable distance. Each of the recording stylus holders 75 is electrically connected to its recording stylus. The record sheet 68 effects the auxiliary scanning by the main roller 71, and the recording styluses effect the main scanning in proportion to the auxiliary scanning. The recording stylus in contact with the record sheet 68 is energized by an electric conductor or feed bar 76 mounted as shown in FIG. 8. The feed bar 76 gives, in general, the voltage of 300 to 700 V in response to the pulse signals transmitted from the transmitter, so that an electrostatic latent image is formed on the record sheet 68 by the voltage applied from the recording stylus. The latent image is made into contact with toner 78 which is mixed by a mixing roller 77, so that the toner adheres to the charged areas to form a visible image. The visible image is thermally fixed by a heating plate 79 from the back of the recording sheet 68, and is discharged out of the receiver by a pair of feed rollers 80 and 81. So far the general principle of the electrostatic belt stylus recording system has been described.

Figure 9A:
FIG. 9(a) is a fragmentary vertical sectional view of a prior art timing belt.
Figure 9B:
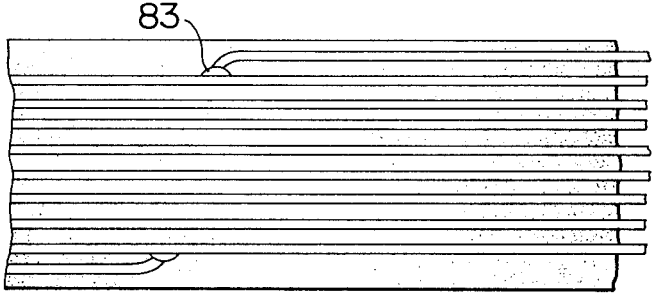
FIG. 9(b) is a fragmentary horizontal sectional view thereof.

Next the mounting of the timing belt 73 and the recording stylus holders 75 on the timing belt 73 will be described in more detail. As shown in FIGS. 9(a) and 9(b), the core of the conventional timing belt 73' consists a steel cord 82 with the ends thereof joined to the steel cord 82 at 83 by soldering. This is to prevent the ends of the steel core from being exposed out of the timing belt 73'. Since the ends of the steel core 82 are joined by soldering, it has been difficult to obtain an uniform flexibility over the whole length of the timing belt 73' and consequently the running of the belt is not uniform, resulting in 'jittering.' Furthermore the conventional timing belts have straight teeth, and the teeth for meshing with those of the timing belt have a straight tooth profile. Therefore the backlash inevitably results, resulting in the non-uniform running and 'jittering.'

Figure 10B:
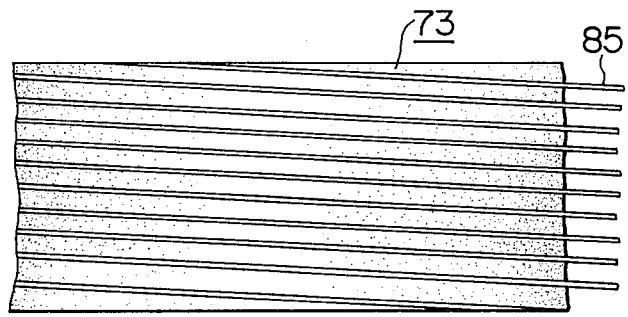

The construction of the timing belt in accord with the present invention is shown in FIGS. 10(a) and 10(b). The core 84 of the timing belt consists of glass fibers 85 which are very flexible, but have a very small elongation percentage. Since the glass fibers are used as the core members, neither the electrical or mechanical problem will occur even when they are exposed out of the timing belt 73. With this construction, the uniform flexibility can be obtained over the whole length of the timing belt. Furthermore, accordng to the present invention the timing belt 73 has straight teeth while the timing belt pulleys have involute teeth so that the backlash may be minimized and consequently excellent images with the minimum jittering may be obtained. Moreover the recording stylus holder 75 is mounted on the timing belt 73 as shown in FIG. 11 in order to further minimize 'jittering.' A plate 87 has teeth adapted to mate with the teeth 86 of the timing belt 73, and the recording stylus holder 75 is securely mounted on the timing belt 73 with the plate 87 and a rivent 88. The portion of the pulley 72 which engages with the plate 87 is cut out in order to facilitate the smooth intermeshing between the timing belt 73 and the pulley 72. With the conventional timing belt with relatively high bending stiffness or rigidity, the timing belt 73 is forced away from the pulley 72 as shown in FIG. 12 in the vicinity of the recording stylus holder 75. However, the timing belt in accord with the present invention is very flexible so that the out-of-contact of the timing belt 73 from the pulley 72 in the vicinity of the recording stylus holder 75 may be minimized as shown in FIG. 13.

SECOND EMBODIMENT, FIGS. 14 AND 15

The second embodiment of a facsimile transmitter in accord with the present invention will be described with reference to FIGS. 14 and 15. The second embodiment may substantially eliminate the problems to be described below of the first embodiment. The first embodiment described above with reference to FIGS. 3 through 6 has the following problems:

1. The starting of the subject copy feed is controlled by the timer after the microswitch 21' has been actuated so that the complete and satisfactory wrapping of the subject copy around the scanning cylinder cannot be sometimes attained depending upon the variation in subject copy feeding speed.

2. The response to the operator from the subject copy in case of engagement thereof with the retaining member 30 is varied depending upon the thickness of the subject copy. As a result, too much insertion of the subject copy tends to occur very often.

3. The subject copy released from the scanning cylinder is discharged along the guide 31 by its own gravity so that the positive discharge of the subject copy cannot be ensured and in addition there is a fear that the discharged subject copy is again wrapped around the scanning cylinder together with the next or new subject copy.

4. The scanning cylinder 22 is supported rotatably by three rollers 23, 24 and 25 and is driven by the driving roller 24. However, the surface contact area between the scanning drum 22 and the driving roller 24 is not sufficient so that the slipping occurs. In order to prevent the slipping, the force exerted from the pressure roller 23 to the scanning cylinder 22 must be increased and consequently the deformation of the scanning cylinder 22 occurs.

The second embodiment shown in FIGS. 14 and 15 was made to overcome the above problems encountered in the first embodiment. In FIG. 14, 91 denotes a feed roller which is normally rotated and has its outer side surface lined with rubber. 92 is a rotatable auxiliary feed roller for cooperating with the feed roller 91. The auxiliary feed roller 92 is adapted to be lifted or lowered by an arm 94 pivoted with a pivot pin 93 and a pin 95 operatively coupled to a solenoid 96.

Disposed below the feed roller 91 is an auxiliary discharge roller 97 which is pressed against the feed roller 91 under the force of a leaf spring 98. 99 is a subject copy feed table; 100, a guide plate for guiding the subject copy to the nip between the feed roller 91 and the auxiliary feed roller 92; and 101, a discharge plate over which is discharged the subject copy.

Next the mode of operation of the second embodiment with the above construction will be described. The subject copy which is inserted by the operator is moved over the subject copy feed table 99 in the direction indicated by the arrow $a$ and is caught by the feed roller 91, which is rotated in the direction indicated by the arrow $b$, and the auxiliary feed rollers 92 to be transported toward a retaining member 103 of a cylinder 102. A copy sensor 104 is actuated by the subject copy to energize a driving motor (not shown in FIG. 14) to be described hereinafter so that the cylinder 102 wraps the subject copy in the direction indicated by the arrow c after a predetermined time lag which is provided by a time delay mechanism. (The predetermined time is equal to a time required for the subject copy to engage with the retaining member 103.) A cylinder position detecting switch 105 is turned off, and in response to the signal generated by this switch 105, the solenoid 96 is energized so that the auxiliary feed roller 92 is moved away from the feed roller 91. As a result, the subject copy which has been caught between the feed roller 91 and the auxiliary feed roller 92 is released and is wrapped around the cylinder 102 at a speed in proportion to the wrapping speed of the cylinder 102.

After the transmission, the cylinder 102 is reversed in rotation in the direction indicated by the arrow d so that the subject copy is discharged over the discharge plate 101 and forced to be discharged out of the transmitter by the feed roller 91 and the auxiliary discharge roller 97. (in the direction indicated by the arrow e).

Next referring particularly to FIG. 15, the cylinder driving mechanism will be described in detail. The cylinder 102 is supported by a roller 123 carried by a driving shaft 121 and a roller 124 carried by a driven shaft 122. A driving belt 125 is wrapped around the cylinder 122, a driving pulley 126 carried by the driving shaft 121 and a pulley 127 rotatably carried by the shaft 122, and the tension is exerted to the driving belt 125 by a tension pulley 128. Since the rollers 123 and 124 for supporting the cylinder 102 are rotated in the opposite direction relative to the direction of rotation of the pulleys 126, 127 and 128, the pulleys 126, 127 and 128 are spaced apart from the cylinder 102.

The motor 129 is reversible and is controlled by the electrical signals, and the rotation of the motor 129 is transmitted through gears 130 and 131 to the driving shaft 121.

The feature or advantage of the driving system described above resides in the fact that, as compared with the rubber roller driving system described elsewhere, the contact area between the cylinder 102 and the driving belt 125 is larger so that the greater power may be transmitted and the positive driven can be ensured. Furthermore the load on the cylinder 102 is distributed so that the cylinder 102 is subjected to less deformation. It should be noted that the driving mechanism similar to that described above is provided on the side of the cylinder 102 in order to ensure the stable drive.

The above described arrangements in accord with the present invention can occur the following features and advantages. Firstly the wrapping of a subject copy is started only after the leading edge of the subject copy has been firmly clamped by the pressure roller, so that the positive and reliable wrapping can be ensured. Secondly, since the scanning cylinder is rotated beyond 360°, the positive wrapping can be ensured and the subject copy can be wrapped around the whole circumference of the scanning cylinder. In a facsimile transmitter provided with the novel subject copy wrapping means enabling to attain the effective use of the whole peripheral outer surface of the transparent scanning cylinder or drum, the slipping mechanism is provided between the driving worm wheel 51 and the cam 47 and the play mechanism provided with a predetermined play angle between the driving worm wheel 51 and the cam 54 so that the common driving means may be used for driving not only the transparent scanning cylinder, around which is wrapped the subject copy, but also the roller for supporting the belt for wrapping the subject copy around the transparent side surface of said cylinder so as to move said roller toward or away from the scanning cylinder surface. Therefore there occurs slipping between the transparent scanning cylinder and roller for driving said transparent cylinder, so that even when the rotation position of the cylinder and the rotation position of the shaft 48 was misaligned, their rotation positions can be maintained in the reference position by the friction or slipping mechanism mounted on the 48 in the manner described above and by the action of the stopper. The pressure roller is pressed against the transparent cylinder 22 through the connecting mechanism with a play angle, the cylinder 22 is rotated after a predetermined time so that only after the subject copy has been wrapped around the said transparent cylinder, the latter is rotated.

Furthermore the second embodiment in accord with the present invention has the following advantages:

1. The operator is only required to insert a subject copy along the table into the nip between the feed rollers so that the mal- or mis-insertion of the subject copy due to the different operators and due to the difference in response of the operators can be eliminated.

2. Since the subject copy wrapping operation is continuous, the step is natural.

3. The positive and reliable feed and discharge of a subject copy can be ensured.

4. The common feed roller may be used for both feed and discharge of a subject copy.

Next the advantage of the scanning and recording system will be described. In the recording system which has as an essential feature the belt stylus of the type consisting of the recording and scanning styluses mounted on the belt having the core made of glass fibers and the involute teeth, the backlash of the intermeshing gears may be minimized and the smooth driving of the belt may be ensured. Therefore the images with excellent quality can be obtained. Furthermore the involute teeth are formed on the timing belt pulley over which are easily formed the involute teeth while the straight teeth are formed on the timing belt so that the intermeshing between the straight and involute teeth is more smoother than the intermeshing between the involute teeth.

In order to mount the recording stylus, the plate having the teeth in mesh with the teeth of the timing belt is used. (In the prior art timing belts, some teeth must be removed for this purpose). Therefore the recording stylus can be mounted without the removal of the teeth of the timing belt. The holding pressure of the rivet is exerted over the whole width of the teeth or a broad area so that the secure joint can be obtained and the breakdown may be minimized.

When a rivet hole is formed through the plate having the teeth in mesh with the teeth of the timing belt, the mounting of the recording stylus can be made with a higher degree of positional accuracy.

What is claimed is:

1. A facsimile system comprising a rotatably supported transparent cylinder around which is wrapped a subject copy to be transmitted, a belt having the width extended in the axial direction of said transparent cylinder, one side edge of said belt being securely attached to the surface of said transparent cylinder in the axial direction thereof while an edge of the opposite side is resiliently biased to oppose the extension or drawing of said belt, a pressure roller for pressing said belt against said transparent cylinder, means for selectively moving said pressure roller toward or away from said transparent cylinder, means for rotating said transparent cylinder, and scanning means adapted to rotate and to be displaced in said transparent cylinder, the subject copy being interposed between the outer side surface of said transparent cylinder and said belt.

2. A facsimile system as set forth in claim 1 further characterized in that a pair of feed rollers are disposed in parallel with said transparent cylinder for feeding the subject copy into the nip between the transparent cylinder and said belt, sensing means is provided for sensing the subject copy wrapped around said transparent cylinder and between said transparent cylinder and said belt, and in response to the output from sensing means and said pair of feed rollers releases the subject copy.

3. A facsimile system according to claim 1 further characterized in that said transparent cylinder has a coating of a hard transparent synthetic resin applied over a transparent resin.

4. A facsimile system according to claim 1 characterized by combining a scanning system comprising timing pulleys having involute teeth on their circumference, a timing belt having rack-shaped teeth mated with said involute teeth of the pulley, said timing belt including core wires made of glass fiber, recording styluses which is fixed to said timing belt for recording information on a recording medium, said recording styluses being scanning by driving said timing pulley.

5. A facsimile system according to claim 4 characterized in that said recording stylus is supported on a holder which is fixed to said timing belt by riveting it through a plate mated with the teeth of said belt.

6. A facsimile system according to claim 1 further comprising a pin extended from the outer side surface of said transparent cylinder, a switch actuating lever so positioned as to be selectively made into operative engagement with said pin, and at least two switches actuable by said switch actuating lever, either of said at least two switches being selectively actuated depending upon the direction in which said switch actuating lever is displaced or swung, thereby detecting the rotation of said transparent cylinder and stopping the rotation of said cylinder for controlling the initial position and the subject copy wrapping position of said transparent cylinder.

7. A facsimile system according to claim 6 further characterized in that said transparent cylinder has a coating of a hard transparent synthetic resin applied over a transparent resin.

8. A facsimile system according to claim 6 further characterized in that a pair of feed rollers are disposed in parallel with said transparent cylinder for feeding the subject copy into the nip between said transparent cylinder and said belt, sensing means is provided for sensing the subject copy wrapped around said transparent cylinder and between said transparent cylinder and said belt, and in response to the output from said sensing means said pair of feed rollers releases the subject copy.

9. A facsimile system according to claim 1 further comprising a cam mechanism adapted to move said pressure roller toward or away from said transparent cylinder, a slipping mechanism for operatively interconnecting between said cam mechanism and driving means such that when a load in excess of a predetermined value is exerted, no driving power is transmitted to said cam mechanism from said driving means, means for operatively interconnecting between said driving means and a roller for driving said transparent cylinder with a predetermined play angle, and scanning means rotable and axially displaceable within said transparent cylinder.

10. A facsimile system according to claim 9 further characterized in that said transparent cylinder has a coating of a hard transparent synthetic resin applied over a transparent resin.

11. A facsimile system according to claim 9 further characterized in that said means for operatively interconnecting between said driving means and said roller for driving said transparent cylinder comprises a belt and pulleys.

12. A facsimile system according to claim 9 further characterized in that a pair of feed rollers are disposed in parallel with said transparent cylinder for feeding the subject copy into the nip between said transparent cylinder and said belt, sensing means is provided for sensing the subject copy wrapped around said transparent cylinder and between said transparent cylinder and said belt, and in response to the output from said sensing means said pair of feed rollers releases the subject copy.

* * * * *